C. L. HOPKINS.
PHOTOGRAPHIC FILM PACK.
APPLICATION FILED OCT. 21, 1910.
1,054,691.
Patented Mar. 4, 1913.
2 SHEETS—SHEET 1.
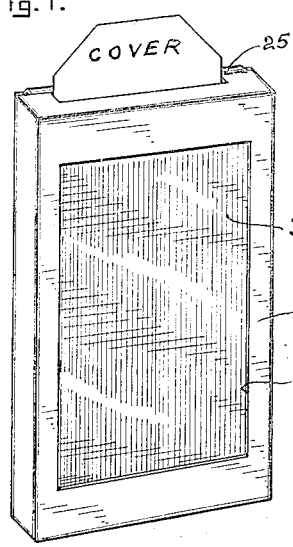
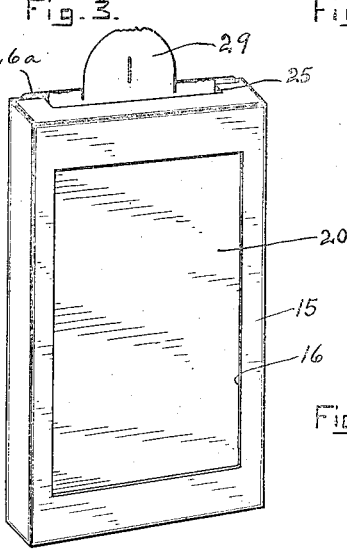
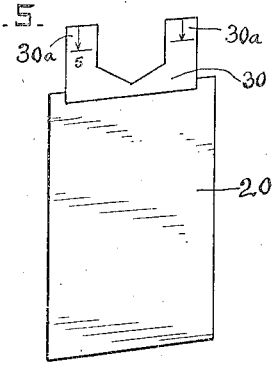
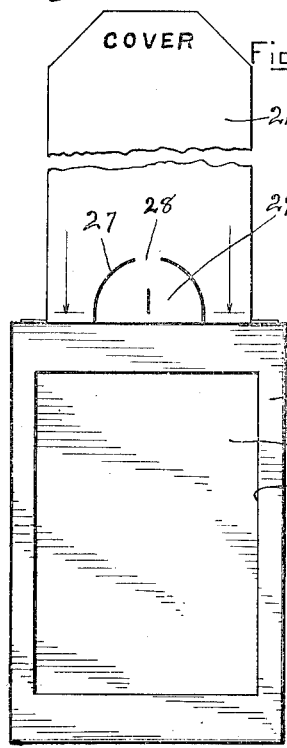
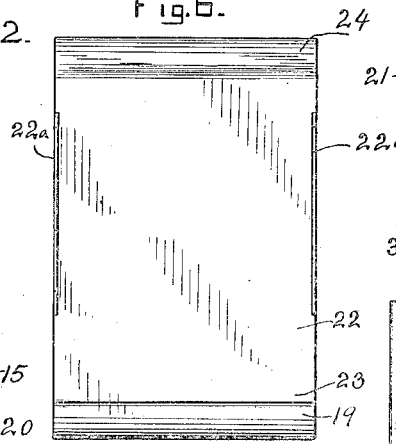
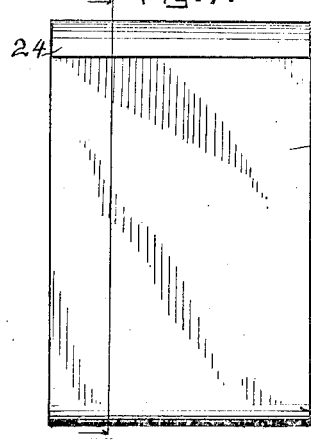
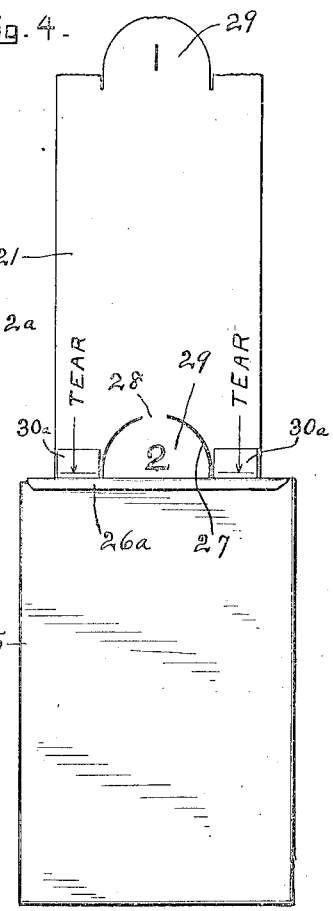
WITNESSES
INVENTOR
Charles L. Hopkins

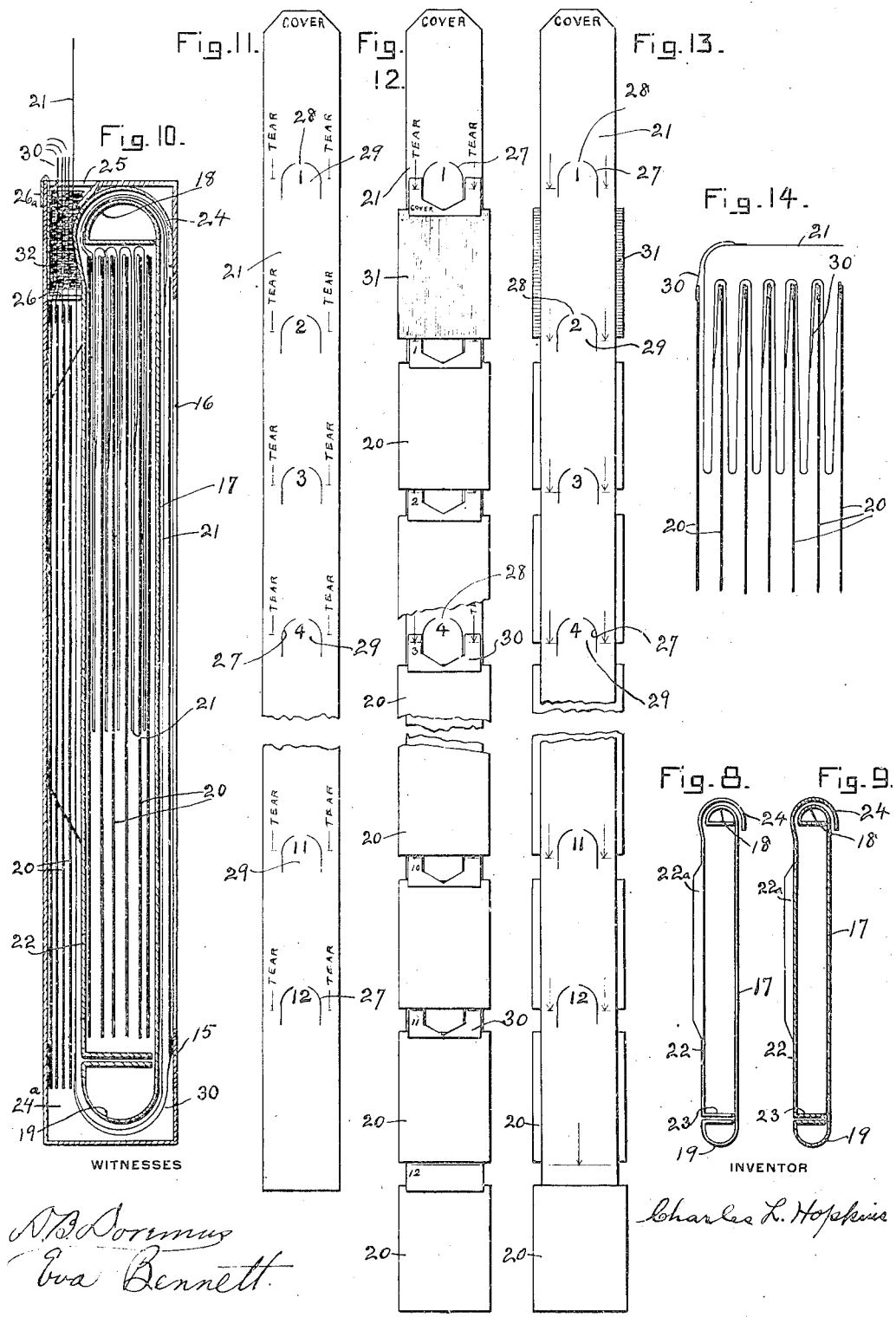

ance.

UNITED STATES PATENT OFFICE.

CHARLES L. HOPKINS, OF DETROIT, MICHIGAN.

PHOTOGRAPHIC-FILM PACK.

1,054,691.  Specification of Letters Patent. Patented Mar. 4, 1913.

Application filed October 21, 1910. Serial No. 588,390.

*To all whom it may concern:*

Be it known that I, CHARLES L. HOPKINS, of Detroit, in the county of Wayne and State of Michigan, have invented certain new and useful Improvements in Photographic-Film Packs, of which the following is a specification.

The usual form of flat film pack, as is well known, contains a number of separate films, to each of which is attached a paper strip, these strips ending in tabs which project from a slit in one end of the carton which forms the casing of the pack, the films being shifted to the back of the pack, one after the other, after exposure, by drawing out and tearing off these paper strips one by one. This form of film pack is subject to certain disadvantages, among which may be mentioned the fact that the operator must select from several tabs the particular one which should be drawn out in order to shift the film last exposed from the exposing position into the chamber which contains the exposed films. If two tabs be grasped and drawn at the same time one of the films will be wasted.

Another disadvantage of the ordinary type of film pack is that when one film is being shifted there is danger of one or more of the other films adhering thereto and being moved out of register with the exposing aperture of the pack. To avoid this the operator is expected to hold back with one hand the tabs of the film which are not intended to be moved, while employing the other hand for drawing out the proper tab to shift the exposed film from the exposing position to the exposed film chamber. This is sometimes inconvenient and is always likely to be forgotten.

It is the principal object of the present invention to provide a flat film pack in which all danger of confusion and error on the part of the operator in drawing the tabs is eliminated, and in which the proper register of each film with the exposing aperture during exposure is assured.

To this end the device, among other features, is so designed that but a single tab is visible or accessible to the operator at any time. There is thus no possibility of the operator inadvertently moving a plurality of films and thereby deranging the device. When a tab has been drawn and a corresponding film moved to the back of the pack the tab for the next film is in position for grasping by the operator.

Another object of the invention is to provide a film pack which may be economically manufactured, and the assembling of which in the dark room may be accomplished with a minimum of difficulty.

While the series of tabs may be constructed and interconnected in various ways, I at present prefer to form all of the tabs of a single piece of paper, which thus becomes an operating strip or band, along which the films are spaced and to which they are attached, the positioning of the films upon this strip being such that when an exposed film has been drawn into the space provided for it the tab corresponding to the next film in the series is in position for grasping by the operator. This strip may be accommodated within the pack by folding the same back and forth between the unexposed films in the space which contains the same. The method of attachment of the films to the strip is preferably such that after a film has been drawn into the space for exposed films, this particular film will be detached from the strip by the act of tearing off the latter, thus permitting the strip to be drawn out the length of another tab to move the next succeeding film from the exposing position into the space for exposed films.

In the accompanying drawings I illustrate one embodiment of the invention which I find satisfactory.

Similar parts are designated by like reference numerals.

Figure 1 is a perspective view of a film pack constructed in accordance with this invention, the device being ready for insertion into a camera or adapter. Fig. 2 is a front elevational view of the same after the first tab or length of the operating strip has been drawn out and the safety cover thereby shifted from the front of the pack into the exposed film chamber at the rear of the same. Fig. 3 is a perspective view of the device, showing its appearance after the safety cover tab has been torn off, leaving the tab for the first film ready for manipulation. Fig. 4 is a rear elevational view of the pack, showing its appearance after the second length of the operating strip (the tab of the first film) has been drawn out and the first film thereby shifted from the exposing position to the exposed film chamber. Fig. 5 is a perspective view of a single film having secured thereto a member by which it is to be attached to the tab strip. Fig. 6 is a rear elevational view of a two part structure which divides the casing into chambers for unexposed and exposed films and provides a flat backing plate between which and the front of the casing the unexposed films are drawn from the unexposed film chamber to the exposed film chamber. Fig. 7 is a front elevational view of this structure. Fig. 8 is an edge elevational view of the same. Fig. 9 is a longitudinal sectional view of the same, the section being taken on the line 9 of Fig. 7, looking in the direction indicated by the arrows. Fig. 10 is a longitudinal sectional view of the complete film pack, showing the same after the safety cover and the first three films have been carried into the exposed film chamber at the rear. Fig. 11 is a view of one side of the tab strip before the films have been attached thereto. Fig. 12 is a view similar to Fig. 11, but shows the strip with the films attached. Fig. 13 is a view similar to Fig. 12, but showing the opposite side of the strip and series of films. Fig. 14 indicates the manner of attaching the films to the tab strip and the method of folding the strip between the films.

In these several figures, 15 is the carton which constitutes the casing of the pack. The front wall of this carton is formed with an exposing aperture 16 as usual, through which the image is projected by the lens upon the film. Within the carton, and extending from one side of the same to the other, is a structure formed of sheet metal or other suitable material which provides an inner chamber for the unexposed films and a chamber at the rear for exposed films. This structure is illustrated by itself in Figs. 6, 7, 8, and 9, and comprises a plate 17 having its ends introverted as seen at 18 and 19, to provide rounded, smooth surfaces around which the tabs and films may pass without unduly bending the films. The unexposed films 20 and the folded tab strip 21 are disposed within the recess which is formed by the ends 18 and 19 of the plate 17 and the side walls of the carton. The rear member 22 of the sheet metal structure consists of a plate having its end 23 bent inward and engaging the upper surface of the introverted portion 19 of the plate 17. Its upper end 24 is curved over the introverted end 18 of the plate 17 so as to provide a narrow curved passage between these parts. The rear member 22 is provided with rearwardly extending wings 22$^a$ which space it away from the rear wall of the casing.

The free or unattached end of the strip 21 passes out of the unexposed film chamber through the curved guideway between the parts 18 and 24 and extends down before the front septum 17, thence under the curved lower end 19 of this part and up into the rear chamber 24$^a$ which is formed by the rear wall of the casing and the rear septum 22. It will be seen that the unexposed films are safely housed in an inner chamber and that the front wall of this chamber provides a flat backing against which a film may lie during exposure. The tab strip, after passing through the rear chamber 24$^a$, extends to the outside of the casing through an opening 25 where it may be grasped by the operator.

When, by drawing out a tab, an exposed film has been drawn into the rear chamber, this film encounters a gage which arrests its movement. This stop or gage may consist of a pair of lugs 26 which extend from a metallic binding strip 26$^a$. The films may be so spaced along the tab strip that when the exposed film is arrested by the gage 26 the next film will have just reached the exposing position. This gage thus serves to insure the proper positioning of the film which is to be exposed in register with the exposure opening, and also serves as a stop to prevent the exposed film being drawn out of the rear chamber through the opening 25. When a film reaches the exposing position in register with the exposing aperture, the portion of the tab strip intervening between this film and the next succeeding film in the series will have been drawn out of the unexposed film chamber into the curved guideway, so that further movement of the tab strip to carry the exposed film to the rear chamber will start the next film in the series out of the unexposed film chamber.

The tab strip 21 is cut at the points designated 27 in Figs. 11, 12 and 13 in such a way that if the same be torn at the points marked " Tear " in Fig. 12 the two parts of the strip will be held together only by a slender connection 28, which may be easily torn, and when so torn will leave a rounded narrow end 29 for the next tab. It is not necessary to leave the connecting part 28, but it is desirable to do so, to guard against the curved end of the tab turning back as the tab strip is drawn along. Each film is secured to the tab strip by a U shaped paper piece 30 which has its lower edge pasted or otherwise secured to the end of the film. The upper ends 30$^a$ of the legs of the U shaped piece 30 are secured to the tab strip upon opposite sides of the narrow tab end 29 in such a position that when the tab is torn at the indicated points the ends of this U shaped piece will be severed, thus freeing the film from the tab. Each of these securing pieces may bear a number which corresponds to the number printed upon that tab which, when drawn, shifts this particular film from the exposing position to the rear chamber.

The last film in the series may be attached directly to the end of the tab strip, while the opposite end of the strip, or the first tab of the series, will preferably be marked "Cover". A paper sheet 31 may form the first member of the series of films and will occupy the exposing position when the pack is put into the hands of the user. This sheet may be marked "Cover".

An examination of Fig. 14 will make clear the method of disposing of the paper tab strip between the films. It will be observed that this strip extends up and down in zig-zag fashion, looping over the films and between them, each film being attached to the strip by means of one of the pieces 30.

The length of the portion of the tab strip between the points of attachment of two adjacent films is equal to the distance traveled by each film in passing from the exposing position to its final position in the exposed film chamber.

In Fig. 10 the pack is shown as containing ten films, whereas in practice it will probably be preferred to include twelve films in each pack, and the tab strip illustrated in Figs. 11, 12 and 13 is designed for this number of films. In this figure the cover and three films are shown as having been drawn into the rear chamber, another film occupying the exposing position and the rest of the films being still disposed in the unexposed film chamber.

It will be seen that in a film pack constructed according to the present invention, but one film occupies a position at the exposing aperture at any time, and it thus becomes unnecessary to provide paper backings for the films or to coat the back of each film with an opaque substance to intercept the light which has passed through the front film, as is necessary with those film packs in which the unexposed films are all disposed one behind another in register with the exposure opening. Until the device is put into use the films are all safely housed within an inner chamber behind a heavy wall through which light cannot penetrate. To exclude light which might otherwise pass to the rear chamber through the tab opening 25 there is provided a brush 32 of plush or the like, between which and the upper portion of the rear septum passes the tab strip.

Having thus described my invention, what I claim as new, and desire to secure by Letters Patent is:

1. A tab strip for a photographic film pack, said strip having within its borders a pair of slits forming the side margins of a tab narrower than the strip, the upper ends of said slits being separated to leave an uncut portion, whereby the tab is prevented from folding back upon the strip.

2. In a photographic film pack, the combination with a casing having an exposing aperture, of a tab strip having slits within its borders whereby narrow tab ends will be formed when the strip is torn across, a series of films, and means for attaching said films to said strip adjacent said slits, said attaching means being arranged to be severed by the tearing of the strip to form the tab ends.

3. In a photographic film pack, the combination with a casing having an exposing aperture, of a series of films in said casing, a tab strip in said casing including a tab for each film, and individual means connecting each film to the tab strip, said means being severable by tearing off the strip after the next succeeding tab has appeared.

4. In a photographic film pack, the combination with a casing having an exposing aperture, of a series of films in said casing, a continuous film manipulating means in said casing extending to the exterior of the casing and including a tab for each film, and means for attaching each film to said manipulating means, said attaching means being severable outside the casing after the next succeeding tab has appeared.

5. In a photographic film pack, the combination with a casing having an exposing aperture, of a series of films in said casing, a film manipulating means connected to all of the films of said series and folded between said films, and individual means for attaching each film to said manipulating means, each of said attaching means being manually severable outside the casing.

6. In a photographic film pack, the combination with a casing having an exposing aperture, of a septum in said casing covering said aperture, a series of films arranged behind said septum, and means connecting all of said films together, said means being folded between said films and extending over one end of said septum and under the other end of said septum and passing to the exterior of said casing.

7. In a photographic film pack, the combination with a casing having an exposing aperture, of a septum in said casing covering said aperture, a series of films arranged behind said septum, and means for drawing said films over the end of said septum and between the latter and the apertured wall of the casing, and then behind said septum, said means being operable from the exterior of said casing.

8. In a photographic film pack, the combination with a casing having an exposing aperture, of a septum in said casing covering said aperture, a series of films arranged behind said septum, film shifting means for moving said films successively over one end of said septum and carrying the same between said septum and the apertured wall of said casing, said means being disposed between the films of said series, and attaching means severable outside of the casing for connecting the films to said film shifting means.

9. In a photographic film pack, the combination with a casing having an exposing aperture, of a septum in said casing covering said aperture, the casing having a chamber for unexposed films and a chamber for exposed films behind said septum, a series of films in said first named chamber, and means for drawing said films successively from said chamber over one end of said septum and under the other end of the same into said second named chamber.

10. In a photographic film pack, the combination with a casing having an exposing aperture, of a septum in said casing, a series of films arranged behind said septum and operating means connected to all of said films and leading to the exterior of the casing for drawing said films in succession around the ends of the said septum to the rear of the casing.

11. In a photographic film pack, the combination with a casing having an exposing aperture, of a septum in said casing, facing said aperture, a series of films behind said septum, and a continuous operating member stored between said films and extending to the exterior of the casing by which the films may be drawn around the ends of said septum to the rear of the casing, and stops for arresting the movement of said films.

12. In a photographic film pack, the combination with a casing having an exposing aperture, of a septum in said casing, facing said aperture, a series of films behind said septum, and a continuous operating member extending to the exterior of the casing by which the films may be drawn around the ends of said septum to the rear of the casing, and stops for arresting the movement of said films, the films being so spaced along said operating member that when a film engages said stop the next film registers with the exposing aperture.

13. In a photographic film pack, the combination with a casing having an exposing aperture, of a septum in said casing covering said aperture, a series of films behind said septum, and an operating member for drawing said films around the ends of said septum, said operating member comprising a series of tabs, and means adjacent each tab for securing a film to said operating member, said securing means being severable outside the casing to detach the films from the operating member.

14. In a photographic film pack, the combination with a casing having an exposing aperture, of a septum in said casing facing the aperture, a series of films arranged behind the septum, and a continuous operating member by which the films may be drawn successively around the ends of said septum, said films being detachably secured to and equally spaced along said operating member at distances equal to the distance traveled by a film in passing from the exposing aperture to the rear of the septum.

15. In a photographic film pack, the combination with a casing having an exposing aperture, of a septum in said casing facing the aperture, a series of films arranged behind the septum, a continuous operating member by which the films may be drawn successively around the ends of said septum, said films being equally spaced along said operating member, and means for securing said films to said operating member.

16. In a photographic film pack, the combination of a casing having an exposing aperture, a continuous film manipulating member in said casing, a stop for engaging an exposed film, and a series of films normally out of register with the exposing aperture so spaced along said film manipulating member that when a film engages said stop another film will register with said exposing aperture.

17. In a photographic film pack, the combination of a casing having an exposing aperture, a thin septum covering said aperture and substantially in the focal plane, said septum having a rearwardly curved end, a series of films behind said septum, and means for drawing said films in succession over said curved end, in front of said septum, and under the opposite end of said septum to the rear thereof.

18. In a photographic film pack, the combination with a casing having an exposing aperture and a chamber for exposed films, of a manipulating means including a marked tab end for each film, said ends being spaced apart along said means at distances equal to the distance traveled by a film in passing from the exposing aperture into said chamber.

19. In a photographic film pack, the combination with a casing having an exposing aperture, and a chamber for exposed films, of a film engaging stop in said chamber, a film manipulating means in said casing including a tab for each film, said films and tabs being so spaced that each tab appears at the exterior of the casing for manipulation when the preceding film of the series engages said stop.

20. In a photographic film pack, the combination with a casing having an exposing aperture and a chamber for exposed films, of an operating strip arranged within said casing and having an end projecting therefrom for grasping, a stop in the exposed film chamber a series of films, and means for securing each film to said strip, each said means being attached to the strip at a point which is outside the casing when the film engages the stop, whereby the same may be severed by the tearing of the strip after a film has been drawn into said chamber.

21. In a photographic film pack, the combination of a casing having an exposing aperture, a thin septum covering said aperture, and substantially in the focal plane, and having a curved rail located at one end thereof and rearwardly of the same, a series of films behind said septum, and means for moving said films in succession over said rail, in front of said septum and under the opposite end of said septum to the rear thereof.

22. In a photographic film pack, the combination with a casing having a chamber for unexposed films, a chamber for exposed films and a passage extending between said chambers, of a series of films stored in said first named chamber, means for shifting said films in succession from said chamber to said passage and from said passage to said second named chamber, the films being exposed while in said passage, and a stop for limiting the movement of each film, said films being mounted upon said shifting means and so spaced apart along said means that when an exposed film is arrested by said stop the following film will register with the exposing aperture.

23. In a photographic film pack, the combination with a casing having an exposing aperture, of a septum in said casing arranged to close said aperture, a series of films stored behind said septum, a continuous operating strip, and means for securing each of said films to said strip, said films traveling with said strip from the rear of said septum one after the other and appearing successively at said exposing aperture and thereafter passing to the rear of said septum, said strip being formed to provide a tab when torn off, and said securing means being attached to the strip at a point where it will be severed when the strip is torn off to form a tab.

24. In a photographic film pack, the combination with a casing having an exposing aperture, of a strip of flexible material folded back and forth upon itself and arranged within said casing and having an end extending from said casing for manipulation, a series of films disposed between the folds of said strip, means for attaching said films to said strip, means for guiding said strip and said films past said exposing aperture, said strip being cut at intervals to form tabs, and means for limiting the movement of a film, said strip having markings indicating the points at which the same is to be torn off and other markings to identify each tab with a particular film.

In testimony whereof I have signed my name to this specification in the presence of two subscribing witnesses.

CHARLES L. HOPKINS.

Witnesses:
D. B. DOREMUS,
EVA BENNETT.